Feb. 4, 1936.  L. B. KIMBALL  2,029,874
METHOD FOR OBTAINING THE OPTIMUM POSITION OF IGNITION
CONTACTS IN INTERNAL COMBUSTION ENGINES
Original Filed Feb. 1, 1934  3 Sheets-Sheet 1

INVENTOR
Leo B. Kimball
BY
Sheffield-Betts
HIS ATTORNEYS

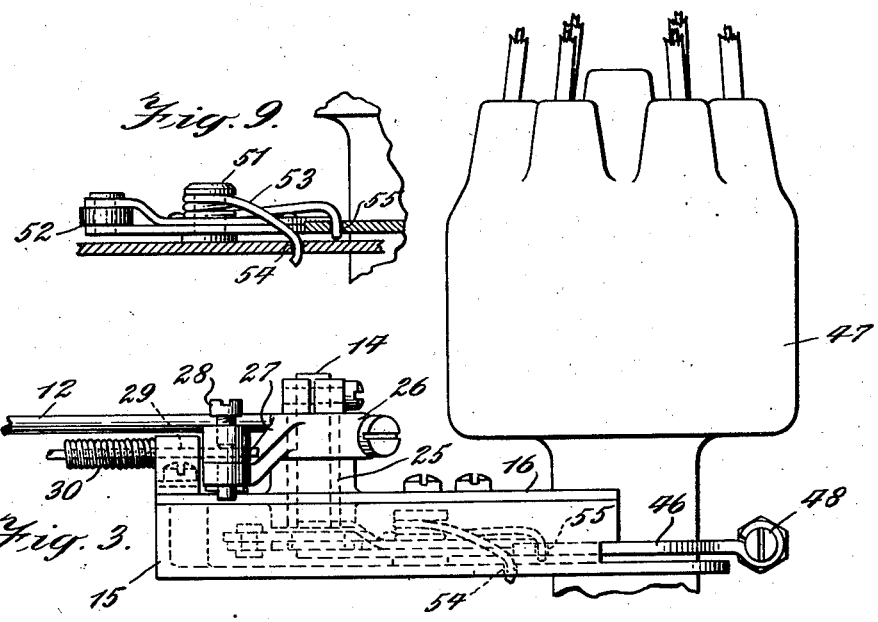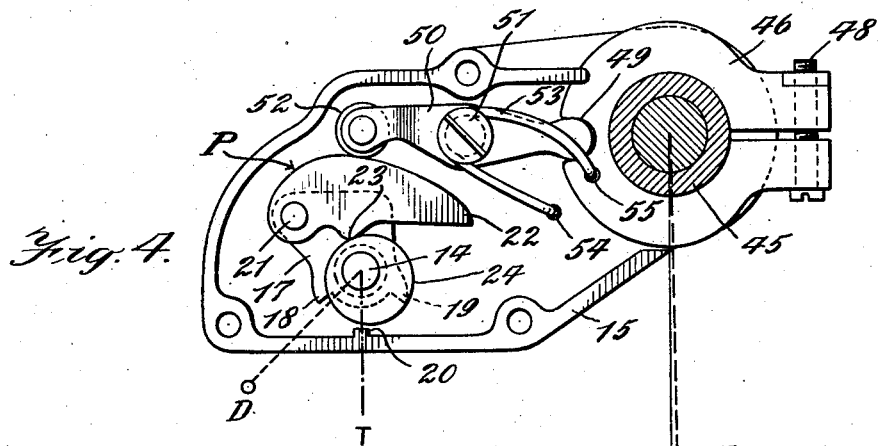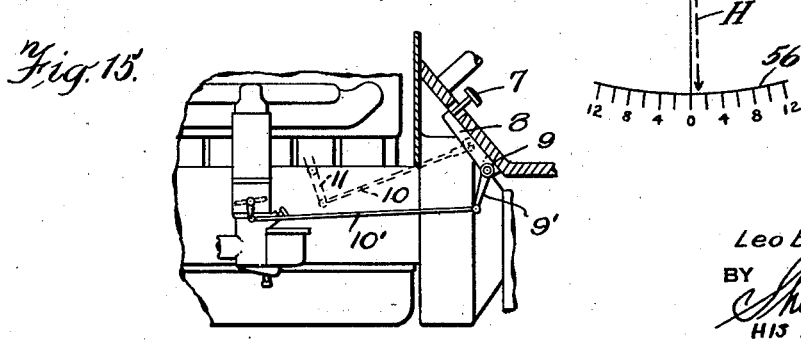

Feb. 4, 1936. L. B. KIMBALL 2,029,874
METHOD FOR OBTAINING THE OPTIMUM POSITION OF IGNITION
CONTACTS IN INTERNAL COMBUSTION ENGINES
Original Filed Feb. 1, 1934 3 Sheets-Sheet 3
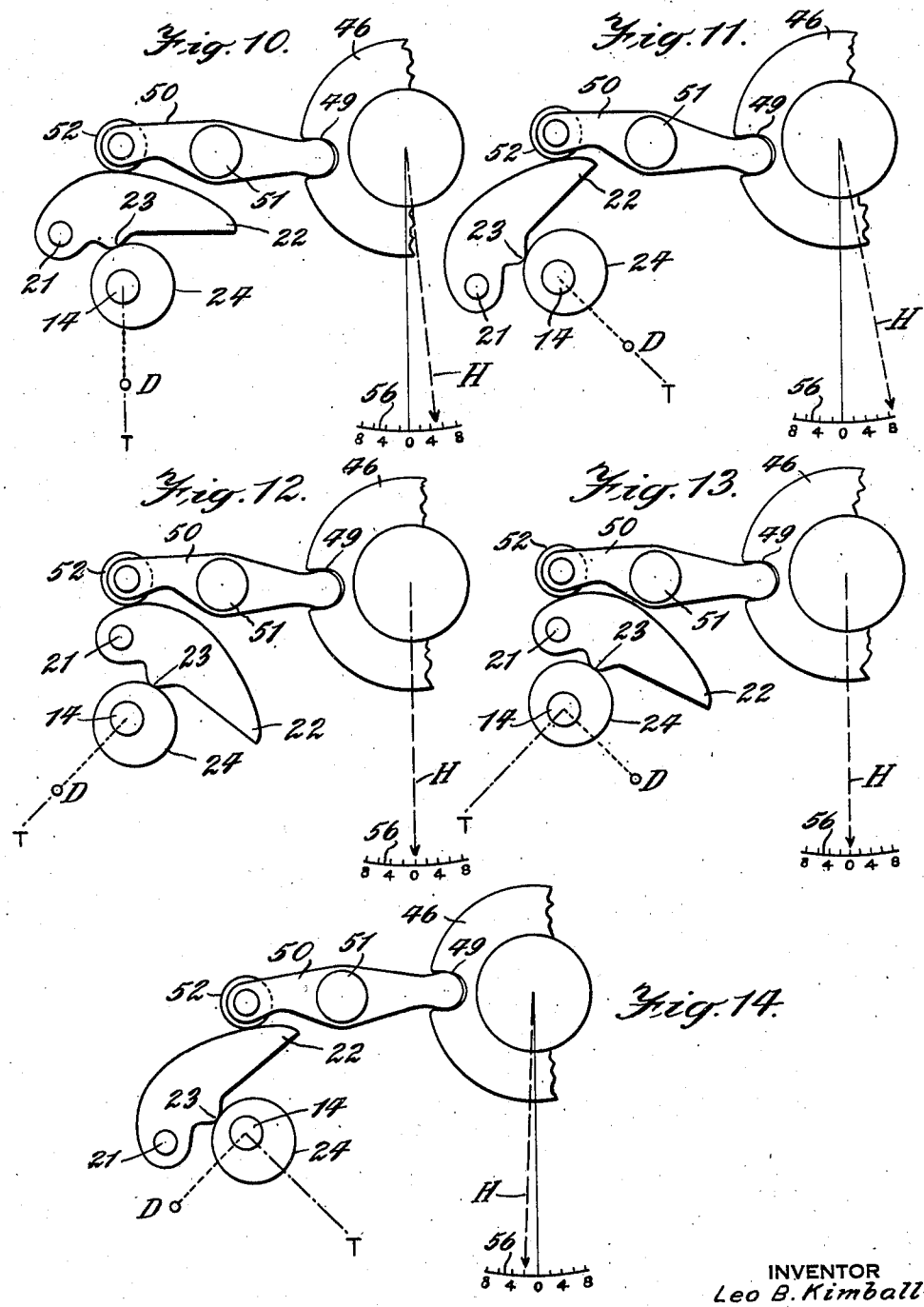
INVENTOR
Leo B. Kimball
BY Sheffield & Betts
HIS ATTORNEYS

Patented Feb. 4, 1936

2,029,874

UNITED STATES PATENT OFFICE

2,029,874

METHOD FOR OBTAINING THE OPTIMUM POSITION OF IGNITION CONTACTS IN INTERNAL COMBUSTION ENGINES

Leo B. Kimball, New Haven, Conn., assignor to Fuel Development Corporation, a corporation of Delaware Original application February 1, 1934, Serial No. 709,313, now Patent No. 2,018,893, dated October 29, 1935. Divided and this application March 7, 1934, Serial No. 714,443

2 Claims. (Cl. 123—117)

This invention relates to certain improvements in methods for determining the best or optimum position of the sparking contacts of an internal combustion engine, depending upon the amount of power required thereof for all conditions under which the engine is operating. My invention relates particularly to the control of the points at which the ignition of the spark occurs or the timing of the spark is produced, as determined by the angular positions of the contact points of the "distributor" forming a part of the electrical system of an automobile engine.

Some of the main advantages of similar devices have been pointed out in my prior application, Serial No. 645,337, filed December 2, 1932, now Patent No. 2,018,892 and Serial No. 707,081, filed January 18, 1934, now Patent No. 2,023,892. This application is a division of my prior application filed February 1, 1934, Serial No. 709,313, now Patent No. 2,018,893.

The present invention includes certain features of improvement in the methods which relate to the efficient operation of an automobile or similar engine at practically all points within the speed and power ranges thereof from the lowest to the highest of each, and especially to provide means to enable the operator to eliminate knocking under various conditions as determined by the grades of fuel used and the operative conditions in the combustion chambers of the engine.

Although one of the main features of this invention, as well as that of my prior inventions, was to eliminate any tendency to so-called detonation or knocking in an internal combustion engine when operating to produce considerable power, yet other advantages result from the present invention which enable the fuel, such as gasoline, to be used more economically at all speeds, including while the engine is idling, and eliminating tendency of the fuel to foul the valves or interfere with the most efficient operation of the engine.

In the present-day automobile construction, the spark control, which effects the advance or retardation of the spark, is usually produced automatically by governors installed when the engine is assembled. Such a spark control produces an advance of the ignition of the charge in desired proportion to the speed of the engine. It approaches the optimum positions for maximum power under best conditions if and when the throttle is wide open. Former devices have not been sufficient to produce optimum positions of the ignition contacts for anti-knock and high economy conditions in the engine at all times.

Differences in atmospheric pressure, temperature, moisture content, in grades of fuels and in combustion chamber conditions, have necessitated changing the entire range of spark advance. Although that might eliminate knocking in the cylinders, it has had a very bad effect upon efficiency and economy.

It is a main feature of this invention to provide a procedure whereby the point of production of the ignition spark may be determined for best efficiency in accordance with the power demanded of the engine as brought about by the operation of the accelerator or throttle controlling devices, and in accordance with detonating characteristics. This is preferably in combination with the automatic spark control above referred to. For this purpose, I have provided connections with the throttle or power control devices of the engine so that the point of ignition is adjusted in relation to the power demanded of the engine, to produce high efficiency and to eliminate knocking, regardless of the speed, and also a driver's independent control of the ignition points when the engine operates under such abnormal conditions as may exist.

Figure 7:
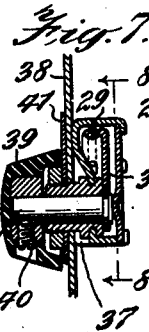
Figure 7 is a vertical section similar to Figure 6 ure 8.
Figure 8:
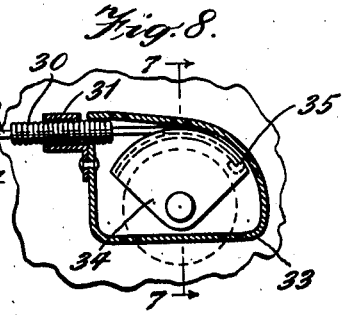

For a detailed description of one form of apparatus for carrying out my invention and which is at present deemed preferable, reference may be had to the following specification and to the accompanying drawings forming a part thereof, in which Figure 1 is a side elevation partly in section of the forward part of an automobile body with an internal combustion engine therein and having my improved apparatus applied thereto;

Figure 3 is a side elevation of the housing shown in Figure 2 and illustrates the distributor mounted above the same;

Figure 4 is a plan view similar to Figure 2 but showing the cover of the housing removed and the relative positions of the various parts in said housing;

Figure 8 is a vertical section of the controlling device as shown in Figure 7 and taken substantially on the line 8—8 thereof;

Figure 9 is a side elevation of the spring tension device located within the housing as indicated in Figure 4;

The third sheet of the drawings includes Figures 10, 11, 12, 13, and 14 in schematic form and represents the parts within the housing in various positions according to the results desired.

Figure 1:
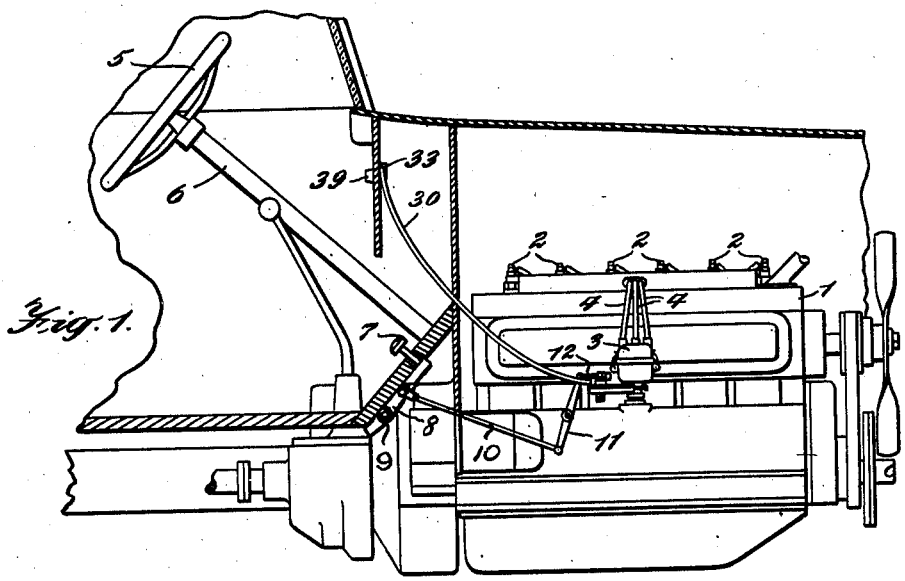

Figure 15 is a side elevation of an engine showing the opposite side of the automobile engine indicated in Fig. 1 and disclosing the relation of applicant's apparatus to the throttle valve and the accelerator pedal.

Figure 2:
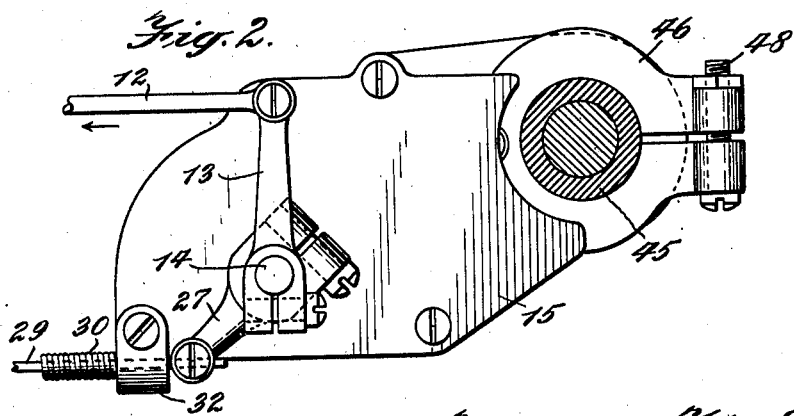
Figure 2 is a plan view of the casing or housing connected with the tubular support for the distributor, which is slightly rotated to determine the amount of advance or retard of the spark ignition.

Referring to the drawings, the numeral 1 indicates the casting or block containing the cylinders of an automobile engine on which are mounted the spark plugs 2 and adjacent to which the distributor 3 is mounted. The latter has the usual conductors or cables 4 passing to all the spark plugs 2. The numeral 5 indicates the steering wheel of the automobile and 6 the steering post or casing for the steering shaft. The numeral 7 indicates the usual "accelerator" button or device for controlling the throttle valve of the engine by the foot of the driver. This is usually provided in addition to the manual control of the throttle valve (not shown) from the steering post or dashboard panel, as is well understood in the art. Said button is carried upon a lever 8, the lower end of which is pivoted and carried on a transverse shaft as at 9. The lever 8 has pivotally connected therewith a rod or similar connection 10 which is pivoted at its forward end on an upwardly extending lever 11, the upper end of which is also provided with a connecting member or rod 12 that is pivotally connected with the crank-arm 13 indicated more clearly in Figure 2. In Fig. 15, the transverse shaft 9 carries a fixed arm 9', pivotally connected with the rod 10', which is also pivotally connected with the throttle valve, as indicated therein. The crank-arm 13 is secured to the outer end of a vertical shaft 14 which passes into the housing 15 through the upper plate 16. The lower end of the shaft 14 carries a plate 17 which constitutes a crank-arm on said shaft and is provided with two projections 18 and 19 forming stops which are adapted to contact with a lug 20 on the housing 15 in order to limit the motion of said crank-arm.

The outer end of the crank-arm 17 is provided with a pin 21 which forms a pivot for one end of the curved cam member 22. The lower longitudinal edge of this cam is provided with a projection 23 adapted to contact with another cam 24 which, in this case, is in the form of an eccentric disc rotatable about the central shaft 14.

The shape of this second cam may be varied to suit various contingencies, but I have found it preferable in the present instance to simply use a circular disc mounted eccentrically about the shaft 14. This eccentric disc is carried on the lower end of a tubular member 25 which extends upwardly through the plate 16 (Figure 3) and has attached to the upper end thereof an adjustable collar 26 carrying a second crank-arm 27. The outer end of this crank-arm 27 is connected by means of a screw or other device 28, with one end of suitable connecting means such as a flexible member or wire 29, that extends through a suitable flexible casing, such as is usually used for such wires, one end of which is illustrated at 30 in Figure 8. The flexible casing for the wire 29 is supported in any preferred way, such as by use of the bracket 31 and the bracket 32. The flexible wire 29 passes into the casing 33 (Figure 8) where it lies in a groove in the outer curved margin of a sector 34 and to which it is fastened, as indicated at 35.

The sector 34 is carried on the inner end of a shaft or rotatable stud 36 which fits a bushing 37 fixed in the instrument board 38, on the dash of the automobile. The outer end of the shaft 36 is provided with a knob 39, through which a screw 40 passes to engage the shaft 36 in order to fix the knob in position thereon. The knob 39 is preferably associated with a suitable indicating plate 41 provided with numerals or other designating marks to show the relative positions of the knob 39, the knob being provided with an arrow 42 or other mark to indicate its angular relation with respect to said numerals.

Figure 5:
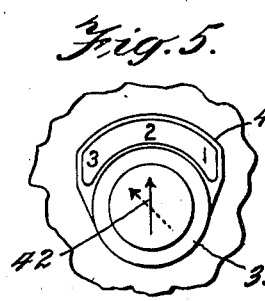
Figure 5 is a front elevation of the means located on the dashboard panel of an automobile for adjusting the control mechanism in accordance with the nature of the fuel or gasoline used or in accordance with the condition of the internal combustion engine.
Figure 6:
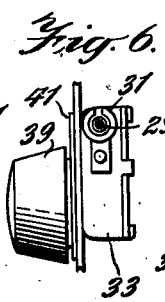
Figure 6 is a side view thereof.

It will be seen that upon turning the knob 39 the sector 34 will be rotated either in a clockwise or in an anti-clockwise direction, as shown in Figure 8, which motions will withdraw the wire 29 toward the right or force the same toward the left, respectively. On account of being enclosed by the flexible casing 30, as indicated in Figure 1, motions of the wire 29 rotate the crank-arm 27 in one direction or the other, the position illustrated in Figure 2 being that corresponding with the position of the arrow 42 when pointing toward the numeral 3, as shown by the dotted arrow in Figure 5. When the arrow is in that position the parts within the housing are in the relative positions as indicated in Figure 4, and at the same time the crank-arm 13 is vertical and corresponds to a substantially half-open position of the engine throttle.

The accelerator foot lever 8 which carries the accelerator button 7 being connected with the crank-arm 13 through the rod 10, lever 11 and rod 12, the action of the operator to accelerate the automobile by stepping on the accelerator button will not only open the throttle of the engine but will move said rod 12 toward the left, thereby moving the crank-arm 13 toward the left. This will tend to turn the crank-arm 17 and so position the cam 22 in relation to the eccentric 24 that it will advance (or retard) the spark as determined by the position of the crank-arm 27.

This latter action is brought about by reason of the fact that the distributor-head-supporting tube 45 engages a clamp 46 which is split and adjusted by means of a screw and nut 48. This clamp controls the position of the distributor head 47 (Figure 3) and therefore controls the timing of the spark contacts with relation to the various spark plugs in the individual cylinder heads.

The clamp 46 is provided with a notch or recess 49 that receives the rounded end of a lever 50, said lever being pivoted in a suitable manner, such as on the stud 51 indicated in Figures 4 and 9. The opposite end of the lever 50 carries an anti-friction roller 52 mounted thereon in any suitable way, one way being indicated in Figure 9. The stud 51 also fixes the position of several coils of a wire spring 53, one end of which enters a hole 54 in the housing 15 and the other end of which enters a hole 55 in the clamp 46. This spring serves to force the clamp 46 and the rounded portion of the lever 50 in a clockwise direction so that the anti-friction roller 52 will contact with the cam 22 under spring pressure. Since the spring 53 contacts with pressure on the housing 15 and contacts with the clamp 46 under spring pressure, there will be a positive electrical contact at both points so that said housing is grounded with the metallic parts of the engine. This grounding may, of course, be accomplished in other ways, but for simplicity this manner of grounding is preferred.

In order to simplify the description of the operation and to indicate definitely the relative positions of the levers and parts, the relative positions of the crank-arm 13 controlled by the accelerator button 7 which operates the throttle, are indicated in Figures 4 and 10 to 14, inclusive, by a dot and dash line terminating with the letter T. This shows the respective positions of the lever 13 but, of course, being on the lower side of the shaft 14, it is oppositely positioned therefrom when displaced from a vertical line.

The position of the controlling crank-arm 27 is indicated by a dotted line terminating in a small circle D.

In Figure 4 the position of the line T and the dotted line with the circle D signifies that the crank-arm 27 is in a position where it would be placed if a poor quality of gas were being used or the engine were in bad condition, while the indicating line T is in a position where it would be at about half-throttle opening. The distributor head tube 45 is shown as having an imaginary dotted line H, the end of which moves across a scale 56 containing successive divisions which serve to indicate the amount of advance or retard in the timing of the spark. The dotted line H is shown on the scale 56 at a point slightly at the right of zero. This zero indicates a point that is preferably a retardation below the normal setting of the usual spark controlling device. The position shown being slightly above one point indicates that the spark has been advanced slightly from its normal position when running with the throttle practically half open and a poor quality of gas or a poor condition of the engine exists.

Under these conditions, the retarding of the spark is somewhat more than the normal retardation for medium power. Such being the case, any bad effect such as knocking, due to poor fuel or poor condition of the engine, is compensated for by the extra retarding of the spark.

However, the position indicated in Figure 4 is reached after opening the throttle more than for the idling position and the further motion has caused the cam 22 to be rotated so that its outermost point (indicated at P, Figure 4) has passed under the roller 52, which has raised said roller and has moved the line H toward the right. That indicates an advance of the spark for about a one-quarter opening of the throttle, thereby increasing the economy at that particular throttle opening.

Figure 10 indicates that a better grade gasoline is used, or what may be called a medium grade. The knob 39 may be turned so that the arrow 42 will point toward the numeral 2 (in Figure 5). This will move the crank-arm 47 and consequently the cam 24 into the position shown in Figure 10. In that case, it is assumed that the throttle is still approximately half-open. The position of the eccentric 24 will cause the cam 22 to be raised, thereby raising the left hand end of the lever 50 and lowering the right hand end thereof. This will rotate the clamp 46 so that the spark is advanced. The dotted line H then indicates that the point on the scale is slightly at the right hand of the division indicated by the numeral "4". This means that the spark has been advanced from the previous position approximately four distributor degrees or eight degrees as to the crank-shaft arm position. The fact that a better gasoline is being used requires a greater spark advance for the best economy at half-throttle and, thus, its attainment will economize the fuel and cause the ignition to take place at a point with reference to the rotation of the crank-shaft arms that is just below the detonating point.

Under these conditions, an examination of Figure 10 shows that the position of the pivot 21 of the cam 22 has not been changed because the shaft 14 remains in the same position as indicated in Figure 4, but the cam 22 has been raised by its point of contact with the eccentric disc 24. With the throttle changed to wide open, the distributor is placed in a more retarded position to prevent detonation with the medium grade fuel assumed in this instance.

In Figure 11, it will be seen that the timing lever T is placed in a position at the extreme right and the circle D which corresponds to the position of the crank-arm 27 is in line therewith. This indicates that a high quality of gas is being used and that the throttle of the engine is practically wide open. Under these conditions, a considerable advance of the spark is necessary in order to operate the engine at the best efficiency, the tendency to detonate or knock being eliminated on account of the high grade of the fuel being used. The end of the dotted line H in Figure 11 has then passed along the scale to a point beyond the division "8", indicating that the distributor-head tube has been turned somewhat more than eight degrees and so produces the positions indicated by the characteristic spark advance curve of the maker of the engine but such advance then takes into account the existing operating conditions.

Figure 12 indicates a condition where a poor fuel is used or the engine is in a poor condition and the throttle is nearly closed, as is usually the case where the engine is idling.

Under those circumstances, the spark has been retarded to the normal point for that degree of throttle opening, as indicated by the position of the end of the dotted line H on the scale 56 in Figure 12. In that case, the eccentric 24 is in practically the same position as it was in Figure 4 but the pivot 21 of the cam 22 has been moved in a clockwise direction so that the projection 23 contacts with said eccentric as indicated. This results in the lever 50 being substantially at the zero position or below that in Figure 4 and the amount of retard of the spark is, therefore, substantially normal.

This is one of the important features of this form of my invention, because as far as I am informed at the present time there has been no apparatus provided by which a spark may be retarded more than is produced by an automatic control when the engine is idling. This is an added feature developed as a result of my investigations from a practical standpoint. This becomes a very useful feature when applied to various makes of present-day automobiles.

The above accomplishments result in a retarding of the spark that is not dependent upon the speeds of the engine as would be the case with an automatic spark control aline, and, on the other hand, at high speeds, with a good grade of fuel, an advance of the spark can be produced that is above that usually attained with other automatic types of distributor controls or timing devices.

In addition to this, the results mentioned are accomplished automatically for all speeds and degrees of power of the engine and settings may be made by the operator or driver to accommodate the grade of fuel that is used, as well as the conditions existing in the combustion chambers of the engine itself. In addition to the above, it will be apparent that at part throttle openings with a normal or medium grade of fuel, the advance will be such that the best economy is produced and the advance of the spark is so made that the ignition will occur at a point eight or more degrees before the normal advance of the spark for which the distributor is set by the usual automatic spark advance mechanism.

In view of the above, the conditions existing as shown in Figures 13 and 14 are self-evident.

Having thus described this embodiment of apparatus for carrying out my present invention, I wish it to be understood that I do not consider this invention limited to the specific details or to the exact procedure set forth, except as may be consistent with the tenor and scope of the accompanying claims, for various changes may be made by automotive or other skilled engineers without departing from the spirit of my invention.

What I claim and desire to protect by Letters Patent is:

1. The method of controlling the advance and retardation of the spark ignition in internal combustion engines, which comprises, primarily advancing the times of ignition concurrently with initial degrees of throttle valve opening, and thereafter manually producing definite retardation of the first mentioned times of ignition over certain limited portions of the range of throttle valve openings during greater power output, to effect high fuel efficiency over all portions of said range and to eliminate knocking which would otherwise occur incident to the use of poor grades of fuel or bad conditions in the combustion chambers of the engine.

2. The method of controlling the advance and retardation of the spark ignition in internal combustion engines, which comprises, first advancing and then retarding the times of ignition concurrently with increasing degrees of throttle valve opening, and in addition thereto, manually producing greater retardation of the first mentioned times of ignition over predetermined portions of the range of throttle valve openings during greater power output, to effect high fuel efficiency over all portions of said range and to eliminate knocking which would otherwise occur incident to the use of poor grades of fuel and bad conditions in the combustion chambers of the engine.

LEO B. KIMBALL.